Sept. 24, 1968 L. JULIE 3,403,322
ALTERNATING CURRENT VOLTAGE REGULATOR
Filed Oct. 7, 1966 3 Sheets-Sheet 1

INVENTOR
LOEBE JULIE
BY Eugene S. Lovette
ATTORNEY

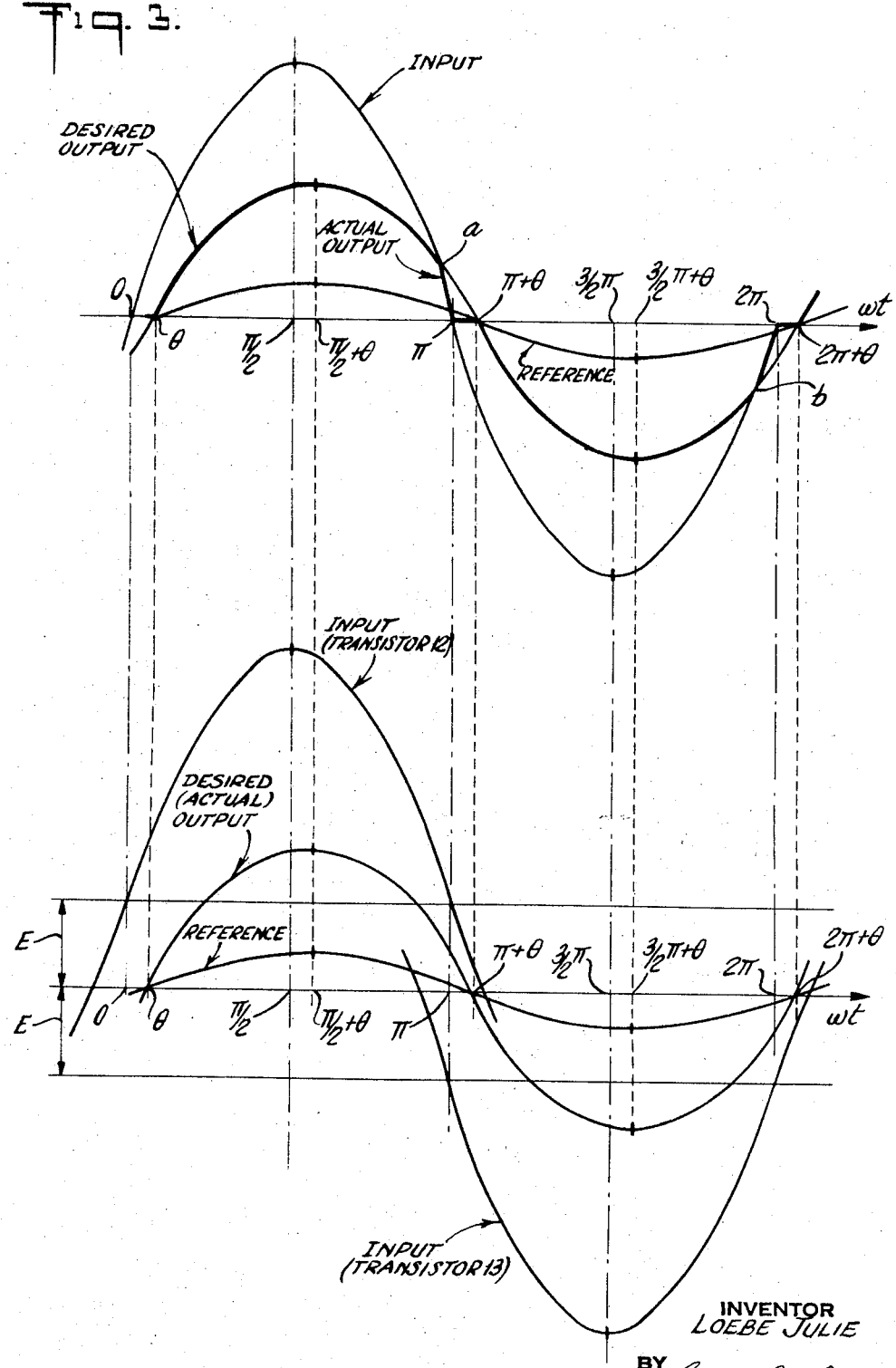

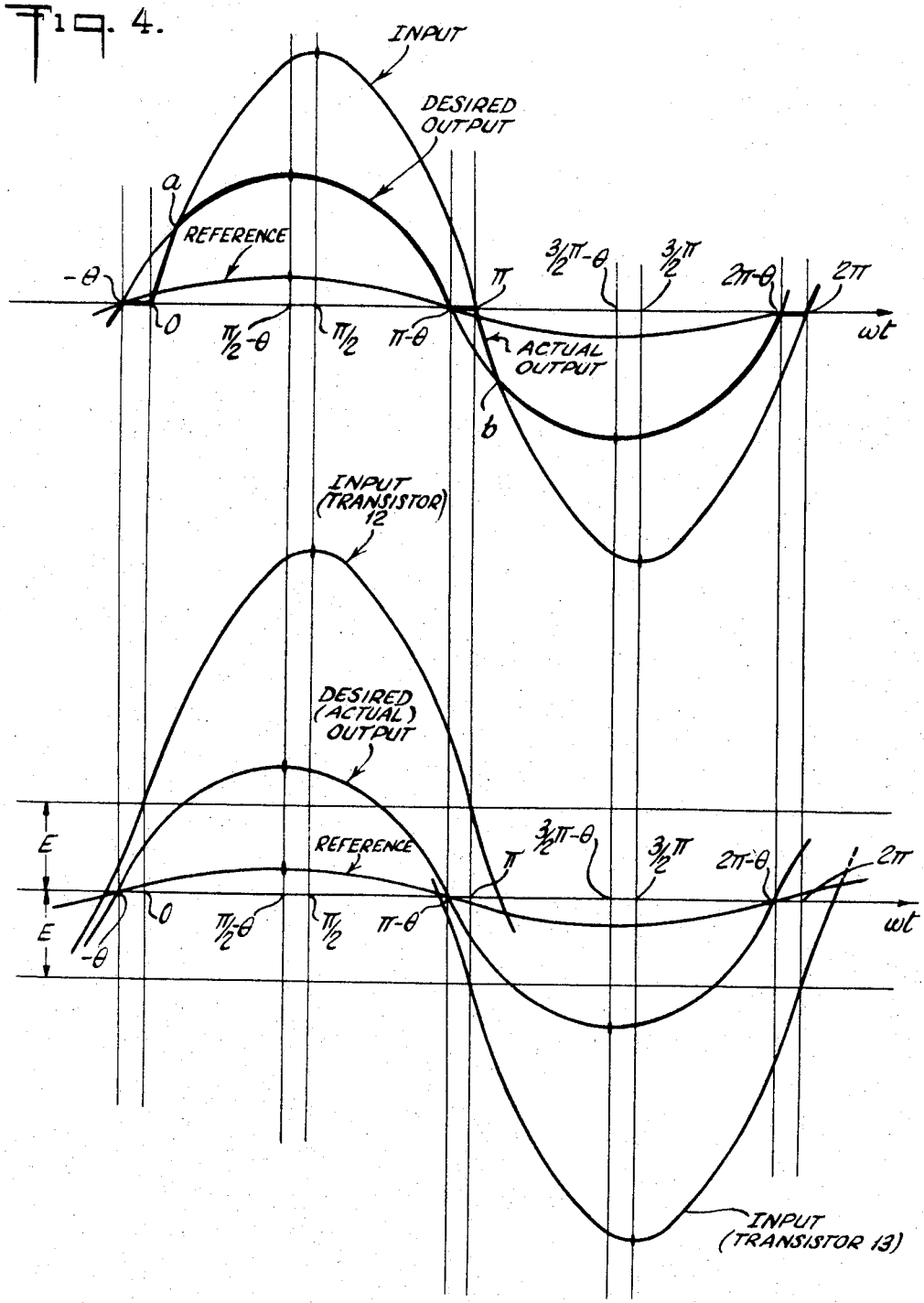

United States Patent Office 3,403,322
Patented Sept. 24, 1968

3,403,322
ALTERNATING CURRENT VOLTAGE
REGULATOR
Loebe Julie, New York, N.Y., assignor to Julie Research
Laboratories, Inc., New York, N.Y., a corporation of
New York
Filed Oct. 7, 1966, Ser. No. 585,147
11 Claims. (Cl. 323—22)

This invention relates to voltage regulators, and more particularly to alternating current voltage regulators.

The purpose of a voltage regulator is to supply a constant valued voltage to a load whose impedance may change in time. The regulator may be supplied with power from a source whose magnitude is not constant, the regulator functioning to convert the variable input voltage to a constant output voltage. The regulator is usually equipped with a mechanism for measuring the load voltage, and if the load voltage departs from the desired value the regulator functions to bring its output voltage back to the predetermined value.

Regulators may be designed for direct current or alternating current operation. Generally speaking, DC regulators are simpler in design than AC regulators. A single transistor may have emitter and collector terminals connected between the DC input source and the load. A feedback network compares the instantaneous load voltage to a reference voltage and in accordance with the difference a bias voltage is applied to the base terminal. In effect, the transistor functions to provide a voltage drop which is variable, but at all times of a magnitude sufficient to provide the desired output voltage when it is subtracted from the instantaneous value of the DC input. DC regulators of this type are not only simple to construct but efficient as well if the transistor regulating device consumes little power.

AC regulators, on the other hand, are far more difficult to construct. The input is an AC signal whose magnitude may vary. The output must be an AC signal of constant amplitude. A single series regulating transistor may not be used because it is capable of conducting current in only one direction. For this reason most prior art AC regulators utilize complex AC amplifiers or constant output voltage transformers.

In Patent No. 3,153,187, issued Oct. 13, 1964, to George N. Klees, an improved transistor alternating current voltage regulator is shown. This regulator uses the DC regulating technique described above. But instead of including a single regulating transistor in series between the input source and the load, two parallel transistors of opposite types are connected in series between the input source and the load. The same feedback signal, which signal is a result of a comparison of the instantaneous output voltage with an AC reference signal, controls the conduction in both transistors. Since the transistors are of opposite types, however, each conducts for only one-half of each cycle of the input signal. During positive half-cycles the "positive" transistor serves as a regulating element with the "negative" transistor remaining off. During negative half-cycles of the input signal the "positive" transistor remains off while the "negative" transistor assumes the function of the regulating element.

The Klees design is both simple and efficient for crude regulation, but is not successful in producing an output which is an undistorted, amplitude-regulated sine wave. The problem which is encountered cannot in practice be solved with the Klees design because it arises from the inevitable differences in phase which exist between the input and reference signals.

The most practical way to derive the reference signal is from the input signal itself, typically through a voltage divider network. The reference signal, unlike the input signal, may be of low power and small amplitude but for a near perfect regulator should be constant in amplitude and of perfect sinusoidal wave form, even though the input will generally vary in amplitude and frequency, and be of distorted wave form. Due to the frequency and phase characteristics of the amplitude limiting circuits and the wave shape filtering circuits which produce the necessary ideal reference signal, the reference signal will not be in exact phase with the input signal even though the frequency will be identical. It will be shown below that because of this phase difference, the output signal will necessarily exhibit distortion.

It is an object of this invention to provide a simple and practical series attenuating type AC regulator which is capable of near perfect regulator performance.

In accordance with the principles of my invention, an attempt is not made to make the phase of the reference signal identical with that of the input signal. Of course, the two phases should be as close as possible, but slight phase differences are inevitable, particularly as filter components change in value with amplitude, time and temperature, and as the input frequency changes. To eliminate the effect of this phase difference, two relatively small magnitude DC supplies are connected between the input source and the two regulating elements. These two supplies are in series with the input source with opposite polarities. As will be explained in detail below, the inclusion of these two DC supplies, e.g., batteries, insures that the load voltage will be an undistorted sine wave and near perfect regulation of this voltage will be achieved. One of the primary advantages of this configuration is that the magnitudes of the two DC supplies need not be controlled accurately. All that is required is that the magnitude of each of the supplies be greater than a minimum value. Thus a near-perfect AC regulator may be constructed very cheaply. The reference signal may be derived from the input signal even though there is a phase difference between them. The two DC supplies may also be derived from the input signal through simple rectifying circuits.

It is a feature of this invention to place in series with each of the regulating elements in a series attenuating type AC regulator a relatively small magnitude DC supply.

Further objects, features and advantages of my invention will become apparent upon consideration of the following detailed description in conjunction with the drawings in which:

FIG. 3 depicts various wave forms in the circuits of FIGS. 1 and 2 when the AC reference signal lags behind the input signal; and FIG. 4 depicts various wave forms in the circuits of FIGS. 1 and 2 when the AC reference signal leads the input signal.

Figure 1:
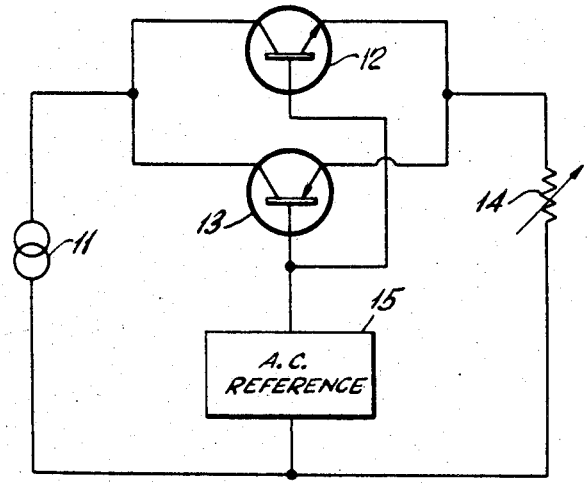
FIG. 1 is the prior art type AC regulator described in the above-identified Klees patent.

The circuit of FIG. 1 is identical, except for different designations, with FIG. 1 of the Kless patent. The unregulated AC input source 11 is connected to the collector of each of transistors 12 and 13. Transistor 12 is of the n-p-n type while transistor 13 is of the p-n-p type. The emitters of both transistors are tied to one end of variable load 14. The base terminals of both transistors are connected to the AC reference signal source 15. In the description of this prior art circuit which follows it is assumed that the reference signal is of the same frequency as the input signal and that their phases are identical.

During the positive half cycles of the input signal, transistor 12 provides a current path between source 11 and load 14 through its collector-emitter circuit. During these positive half cycles transistor 13 remains off. The base terminal of transistor 12 is connected to reference source 15, the output voltage of this source being the positive half of a sinusoid during each positive half cycle of the input signal. The emitter-base voltage for transistor 12 is thus equal to the difference between the instantaneous magnitude of the load voltage and the instantaneous magnitude of the reference signal. If for some reason the impedance of load 14 increases, tending to cause an increase in the output voltage, the emitter of transistor 12 goes more positive with respect to the base, the current through the transistor decreases and the load voltage returns to the proper magnitude. Although the base and emitter voltages are always changing since the input and reference signals are sinusoids, it is the relative difference between the emitter and base voltages which controls the regulator. If the load voltage for some reason tends to decrease in magnitude the base of transistor 12 becomes more positive with respect to the emitter, and an increased current flows to the load.

During the negative half cycles of the input signal the output and reference signals are also negative. During these half cycles transistor 13 conducts rather than transistor 12. The same difference voltage is applied across the emitter-base junction of transistor 13 and the regulator functions in a similar manner. The AC regulator of FIG. 1 is similar to conventional DC regulators except that two regulating elements are used instead of one and the reference voltage is an AC signal.

The circuit of FIG. 1 is simple yet reliable. However, the output signal can follow the reference signal only if the reference signal is in exact phase with the input signal. The reason why the circuit cannot operate properly if the input and reference signals are out of phase will become apparent upon consideration of the wave forms of FIGS. 3 and 4. Before examining these wave forms, however, it must be understood that transistors 12 and 13 serve as *attenuators* in the circuit of FIG. 1. The sum of the voltage drops across the conducting transistor and the load equals the value of the input signal at all times. Consequently, the magnitude of the output wave form is always smaller than that of the input wave form. Each of the transistors, when conducting, does not amplify the input signal. (The base signal may be amplified but it is the signal of source 11 which is being considered.) The transistors can only attenuate the input signal.

Figure 2:
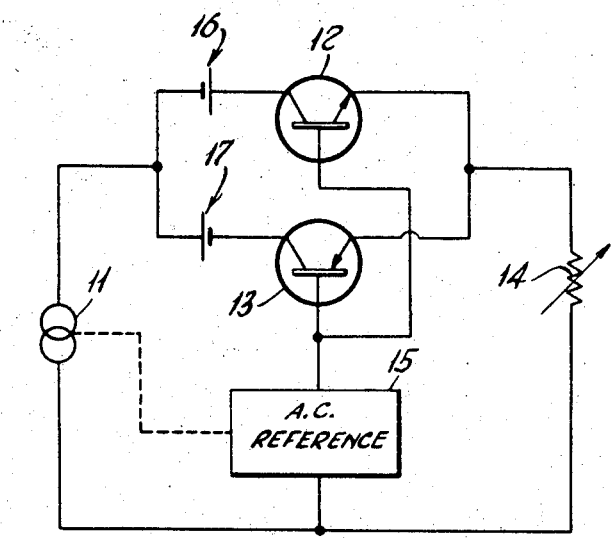
FIG. 2 depicts an illustrative embodiment of my invention.

The illustrative embodiment of my invention, shown in FIG. 2, is identical to the prior art circuit of FIG. 1 except for the addition of batteries 16 and 17. The dotted arrow between source 11 and the reference source 15 represents amplitude and filter networks, of conventional design, for deriving the constant amplitude pure sinusoidal reference signal. The relative polarities of the two batteries should be noted. Battery 16 is poled in a direction to increase current flow through transistor 12. Similar remarks apply to battery 17 and transistor 13.

The advantages of my invention may be best appreciated upon consideration of the wave forms shown in FIGS. 3 and 4. The upper wave forms in FIG. 3 are those observed in the prior art circuit of FIG. 1 if the reference signal lags behind the input signal. The lower wave forms are those observed in the circuit of FIG. 2 under the same condition. FIG. 4 shows similar wave forms when the reference signal leads the input signal.

Consider first the upper group of wave forms in FIG. 3, those exhibited by the prior art circuit of FIG. 1 if the reference signal lags behind the input signal by $\theta$ degrees. The three wave forms which are shown are those of the input signal, the reference signal and the desired output signal. The peaks of each signal are shown by a short vertical line. The greatest amplitude is that of the input signal. The smallest amplitude is that of the reference signal. The desired output signal has an amplitude greater than that of the reference signal but smaller than that of the input signal, since the regulating transistors serve as attenuators. It should be noted that the phase of the desired output is the same as that of the reference signal. The output signal must follow the reference signal since the "error" signal across the two emitter-base junctions is the difference between the output and reference signals.

The method for analyzing the output wave form which is actually obtained is to follow the desired output signal and to see if it can indeed be achieved. In the following analysis the word "time" refers to the product, in degrees, of $\omega$ and time, where $\omega$ is the frequency of all signals multiplied by $2\pi$.

At time $\theta$ and immediately thereafter it is seen from FIG. 3, that the input signal is greater in magnitude than the desired output signal. Consequently, the conducting transistor 12 can function properly as an attenuator to provide the desired output signal. The actual output signal is in fact the desired output signal from $\theta$ until point $a$ is reached. At this time it will be noted that due to the phase difference between the input signal on one hand and the reference and desired output signals on the other hand the input signal is smaller in magnitude than the desired output signal. Transistor 12 cannot amplify the input signal, but can only attenuate it. Consequently, the best that can be hoped for is that the actual output signal be equal to the input signal after point $a$ is reached. The actual output wave form is shown in the drawing by a heavy line. It will be noted that while the actual output signal follows the desired output signal up to point $a$, at this point it switches and follows the input signal.

At time $\pi$ the input signal goes negative. Transistor 12 cannot conduct at all (in the absence of leakage current). As for transistor 13 which is now enabled to conduct by the negative input signal half cycle, it too cannot conduct because the reference signal is still positive and consequently its emitter-base junction is reverse biased. Thus between times $\pi$ and $\pi+\theta$ there is no output signal.

At time $\pi+\theta$ transistor 13 starts conducting because the reference signal goes negative to forward bias its emitter-base junction. Since the input signal is greater in magnitude than the desired output signal transistor 13 can properly function as an attenuator and the actual output signal once again follows the desired output signal.

When point $b$ is reached, however, the input signal is smaller in magnitude than the desired output signal, and at best the actual output signal can only equal the input signal. Thus once again the actual output wave form switches between the desired output and input sinusoids. At time $2\pi$ the input signal goes positive and transistor 13 cannot conduct at all. As for transistor 12 it does not resume conducting until the reference signal goes positive to forward bias its emitter-base junction. Thus once again the output signal is of zero magnitude. At time $2\pi+\theta$ the reference signal goes positive and transistor 12 conducts once again, with the actual output following the desired output wave form.

Thus due to the phase difference which exists between the input and reference signals, the composite actual output wave form exhibits considerable distortion. This distortion is sufficient in high quality regulator applications to militate against the use of the circuit of FIG. 1 unless complex equalizing circuits can be provided for eliminating the phase difference which appears between the input and reference signals as a function of temperature, time, amplitude and frequency.

The lower group of wave forms in FIG. 3 apply to the circuit of FIG. 2. The reference and desired output wave forms are identical to those for the circuit of FIG. 1. The major difference relates to the input signals. The input signals for the two transistors are now different. If the magnitude of each of sources 16 and 17 is E, the input signal for transistor 12 is the input signal of the source superimposed on a positive level of magnitude E. The complete wave form is not shown in the drawing since transistor 12 can conduct only when the composite signal is positive. When the composite signal is negative the transistor cannot conduct and therefore this portion of the signal is of little interest. Similarly, the input signal for transistor 13 is the actual input signal from source 11 superimposed on a negative level of magnitude E. The composite wave form is thus lowered. The only part of the wave form which is of interest is the negative part since it is only when the collector of transistor 13 is negative that the transistor can conduct. For this reason the input signal for transistor 13 is shown only during its negative region.

At time $\theta$ and immediately thereafter the input signal is greater in magnitude than the desired output signal and transistor 12 properly functions as an attenuator. Because the input wave form for transistor 12 has been raised with respect to the input signal in the upper group of wave forms, it is seen that between times $\theta$ and $\pi+\theta$ the input signal is always greater in magnitude than the desired output signal. Consequently, for the entire half cycle transistor 12 functions as an attenuator and the actual output signal is the same as the desired output signal.

At time $\pi+\theta$ the reference signal goes negative, transistor 12 turns off and transistor 13 starts conducting. Because the input signal for transistor 13 has been lowered with respect to the input signal in the upper group of wave forms, between times $\pi+\theta$ and $2\pi+\theta$ the input signal is always greater in magnitude than the desired output signal. Consequently, transistor 13 attenuates the input signal as desired and the actual output signal follows the desired output wave form. Thus the output signal is a true sinusoid with no distortion.

It should be noted that the actual output signal lags behind the input signal by $\theta$ degrees. No attempt is made in the circuit of FIG. 2 to use complex equalizing circuits for making the phase of the reference signal identical with that of the input signal. Instead, two batteries are used to insure that the output signal is a true sinusoid. The fact that the output signal lags behind the input signal is almost never of importance. The system operating from the regulator, shown symbolically as load 14, must be provided with a constant amplitude sinusoidal signal. Unless the system is somehow tied to source 11 the phase difference between the input and output signals of the regulator is of no moment.

The minimum value of E may be computed analytically. In the analysis the input wave form for transistor 13 can be considered as well as the input wave form for transistor 12, although the latter will be considered in what follows. At time $\pi+\theta$, if the input signal from source 11 has an amplitude of $E_{in}$, the total input signal for transistor 12 has a magnitude of $E+E_{in} \sin (\pi+\theta)$. This value must be greater than zero in order that the negative sloped portion of the input wave form will not intersect the desired output wave form. Since $E+E_{in} \sin (\pi+\theta)>0$ is equivalent to $E>E_{in} \sin \theta$, it is seen that once the amplitude of the input signal and the extent of the phase lag are known the minimum magnitude of the two batteries may be computed. The important point to note is that the two power supplies need not have constant values as long as the minimum value is exceeded. Referring to FIG. 3 it is seen that if the magnitude of E increases the input wave form for transistor 12 is merely raised and that for transistor 13 is lowered. The input wave forms still do not intersect the desired output wave form. The increased total input signal to each transistor merely results in a greater attenuation by the conducting transistor. For this reason the two DC supplies 16 and 17 may consist of simple diode rectifying circuits which may include inexpensive filters which smooth the outputs but do not necessarily eliminate the ripples.

In FIG. 2 the reference signal is derived from the input source, this being shown symbolically by the dotted arrow. The reference signal, of course, must be of constant amplitude. (It may be variable in accordance with a potentiometer setting, but for any given setting the amplitude should not vary.) Even though the input signal may vary in amplitude, it is not at all difficult to derive a constant amplitude low value reference signal. The input signal may be extended through a limiting or clipping circuit, such as two oppositely poled diodes connected in series. The output of the limiting circuit is a distorted sine wave with a constant amplitude independent of the amplitude of the input signal. The distorted or clipped wave form has a fundamental frequency equal to that of the input signal with additional harmonics. If the signal is then passed through a filter with a cut-off frequency just above the fundamental frequency, the filter output will be an undistorted sine wave of constant amplitude and of the input signal frequency.

One additional observation should be made with reference to the upper actual output wave form of FIG. 3. Between times zero and $\theta$, and times $\pi$ and $\pi+\theta$, the actual output of the prior art circuit is shown to have zero magnitude. This is due to the fact that one of the regulating transistors is cut off because the instantaneous polarity of the reference signal inhibits the transistor from conducting, and the other transistor is cut off because the instantaneous polarity of the input signal inhibits it from conducting. Actually, if the transistors are not perfect there will be leakage current through them. As a result, between times zero and $\theta$ (or $2\pi$ and $2\pi+\theta$) the actual output will have a very small positive slope. Similarly, between times $\pi$ and $\pi+\theta$ the actual output will have a small negative slope. Thus, if imperfect transistors are used the actual output wave form distortion is slightly different from that shown in FIG. 3. But the distortion during these time periods may be significant, as is the distortion between point $a$ and time $\pi$ and between point $b$ and time $2\pi$. In the circuit of FIG. 2 the distortion is completely eliminated because the input wave forms for the transistors and the desired output wave form do not intersect.

In the wave forms of FIG. 3 the reference signal is shown lagging behind the input signal by $\theta$ degrees. It is also possible that the reference signal may lead the input signal. This situation is shown in FIG. 4 where the reference signal leads the input signal by $\theta$ degrees, the upper group of wave forms being applicable to the circuit of FIG. 1 and the lower group being applicable to the circuit of FIG. 2. When the reference signal leads the input signal it is seen from the drawing that without the inclusion of the two additional DC supplies the actual output signal is distorted at the beginning of each half-cycle rather than at the end of each half-cycle. Between times $-\theta$ and 0 the reference signal is positive and transistor 13 is reverse biased. Since the input signal is negative, transistor 12 cannot conduct as well, and there is no output signal. Starting with time 0, the input signal is positive and transistor 12 can conduct. But because the desired output signal is of a magnitude greater than that of the input signal, the transistor cannot function as an attenuator. Consequently, the actual output signal follows the input signal. Only at point $a$ does the magnitude of the input signal become greater than that of the desired output signal, and only then does the actual output signal follow the desired output signal. The actual output signal remains undistorted until the end of the half-cycle at time $\pi-\theta$. Similar remarks apply to the negative half-cycle of the output signal. The actual output signal is distorted between time $\pi-\theta$ and point $b$. It is the latter part of the half-cycle of the output signal which follows the desired output signal.

With the addition of batteries 16 and 17, however, it is seen from the lower group of wave forms that the actual output signal follows the desired output signal at all times. The two DC supplies cause the respective input signal wave forms to be raised and lowered as shown in the drawing. By raising the input wave form for transistor 12 such that between times $-\theta$ and 0 it is greater in magnitude than the desired output signal, and by lowering the input wave form for transistor 13 such that between times $\pi-\theta$ and $\pi$ it is more negative than the desired output signal, the input and desired output signals do not intersect. Through an analysis similar to that above it can be shown that the minimum magnitude for E is once again $E_{in} \sin \theta$, where $\theta$ is now the number of degrees by which the reference signal leads the input signal.

It should be noted that there may be some leakage current through the cut-off one of transistors 12 and 13 in each half-cycle which, while advantageous in the circuit of FIG. 1 for the reasons described above, would not appear beneficial in the circuit of FIG. 2. The leakage current, however, merely flows through the other conducting transistor and is not delivered to the load. The small loop current through the two emitter-collector circuits has no effect on the regulated output.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. An alternating current voltage regulator comprising an unregulated source of alternating current input voltage, a source of alternating current reference voltage having a frequency the same as that of said input source, a load, first and second opposite-type transistors each having an emitter terminal connected to one end of said load, the base terminals of each of said transistors being connected to one end of said reference source, a first source of direct current voltage connected between the collector terminal of one of said transistors and one end of said input source, a second source of direct current voltage connected between the collector terminal of the other of said transistors and said one end of said input source, said first and second sources of direct current voltage each being poled to bias the respective connected transistor for conduction, and means for connecting together the other ends of said input source, said reference source and said load.

2. An alternating current voltage regulator in accordance with claim 1 further including means for deriving said reference source voltage from said input source.

3. An alternating current voltage regulator comprising an unregulated source of alternating current input voltage, a source of alternating current reference voltage, a load, first and second oppositely poled unidirectional conducting regulating elements for alternately conducting current from said input source to said load, means for controlling the instantaneous conduction in the conducting one of said regulating elements in accordance with the difference between the magnitude of the voltage across said load and the magnitude of said reference voltage, and first and second means coupled respectively to said first and second regulating elements for increasing the current conduction from said input source through said regulating elements.

4. An alternating current voltage regulator in accordance with claim 3 wherein said first and second conduction increasing means are direct current voltage supplies connected in series with the respective ones of said first and second regulating elements.

5. An alternating current voltage regulator in accordance with claim 4 wherein said first and second regulating elements are amplifying devices having their input terminals connected through said respective first and second direct current voltage suplies to said input source and their output terminals connected to said load.

6. An alternating current voltage regulator in accordance with claim 5 wherein each of said regulating elements includes an input control circuit, and said conduction controlling means includes means for applying a signal to each of said input control circuits dependent on said difference voltage.

7. An alternating current voltage regulator in accordance with claim 6 wherein said first and second regulating elements are opposite-type transistors, and said first and second direct current voltage supplies are connected to said input source with opposite polarities.

8. An alternating current voltage regulator in accordance with claim 4 further including means for deriving said reference source voltage from said input source.

9. In an alternating current voltage regulator having a source of alternating current input voltage, a source of alternating current reference voltage having a frequency the same as that of said input source, a load, first and second oppositely poled unidirectional conducting regulating elements connected between said input source and and said load for extending current from said source to said load during alternate half-cycles of the input voltage signal, and means for controlling the conduction of each of said regulating elements during the respective half-cycles of conduction in accordance with the relative magnitudes of the voltage across said load and the voltage of said reference source, the improvement comprising means for boosting the input signal from said input source applied to each of said regulating elements such that the instantaneous magnitude of the input signal for each of said elements in the respective conducting half-cycles is at all times greater than the instantaneous magnitude of the predetermined voltage which is to appear across said load.

10. An alternating current voltage regulator in accordance with claim 9 wherein said boosting means includes first and second oppositely poled direct current voltage supplies connected between said input source and respective ones of said first and second regulating elements.

11. An alternating current voltage regulator in accordance with claim 10 wherein the magnitude of each of said direct current voltage supplies is greater than the amplitude of said alternating current input voltage multiplied by the sine of the angular phase difference between said input source and said reference source.

References Cited

UNITED STATES PATENTS 2,873,367   2/1959   Zawels.

LEE T. HIX, *Primary Examiner.*

A. D. PELLINEN, *Assistant Examiner.*